United States Patent
Bagatin et al.

(10) Patent No.: US 10,442,713 B2
(45) Date of Patent: Oct. 15, 2019

(54) PROCESS FOR THE TREATMENT OF CONTAMINATED WATER BY MEANS OF ADSORPTION AND NANOFILTRATION

(75) Inventors: Roberto Bagatin, Legnano Mailand (IT); Rodolfo Vignola, Monterotondo (IT); Raffaello Sisto, Rome (IT); Marco Petrangeli Papini, Rome (IT); Riccardo Tuffi, Rome (IT); Alessandra De Folley D'Auris, Rome (IT)

(73) Assignee: ENI S.P.A., Rome (IT)

( * ) Notice: Subject to any disclaimer, the term of this patent is extended or adjusted under 35 U.S.C. 154(b) by 843 days.

(21) Appl. No.: 13/882,401

(22) PCT Filed: Nov. 3, 2011

(86) PCT No.: PCT/EP2011/069356
§ 371 (c)(1),
(2), (4) Date: Jun. 17, 2013

(87) PCT Pub. No.: WO2012/059553
PCT Pub. Date: May 10, 2012

(65) Prior Publication Data
US 2014/0151303 A1    Jun. 5, 2014

(30) Foreign Application Priority Data

Nov. 5, 2010  (IT) .............................. MI2010A2061

(51) Int. Cl.
*C02F 9/00*    (2006.01)
*B01J 20/18*    (2006.01)
(Continued)

(52) U.S. Cl.
CPC .............. *C02F 9/00* (2013.01); *B01D 61/027* (2013.01); *B01D 61/04* (2013.01); *B01D 69/02* (2013.01);
(Continued)

(58) Field of Classification Search
None
See application file for complete search history.

(56) References Cited

U.S. PATENT DOCUMENTS 5,080,799 A * 1/1992 Yan .................... C02F 1/288
                                                  210/661
5,552,055 A    9/1996 Arato et al.
(Continued)

FOREIGN PATENT DOCUMENTS

JP          9099284 A      4/1997
WO    2006116533 A2    11/2006
(Continued)

OTHER PUBLICATIONS

Brooms et al., "Characterization of NF Membranes for Rejection of Varying Oxidations of Nickel (Ni), Copper (Cu), and Palladium (Pd)", Department of Chemistry, Vaal University of Technology, P. Bag x021, Vanderbijlpark, 1900 South Africa, accessed from Web, Mar. 4, 2016, 11 total pages.*
(Continued)

*Primary Examiner* — Jonathan M Peo
(74) *Attorney, Agent, or Firm* — Tarolli, Sundheim, Covell & Tummino LLP

(57) ABSTRACT

A process for the treatment of water contaminated by polar and/or apolar organic compounds, and/or by heavy metal salts, and/or by oil dispersed or in emulsion, comprises sending said contaminated water to a system comprising: at least one adsorption (3) unit including at least one microporous or mesoporous alumina-silicate; at least one nanofiltration unit (7) including at least one hydrophilic nanofiltration membrane; wherein said hydrophilic nanofiltration membrane has a contact angle with water lower than or equal to 45°, preferably ranging from 25° to 40°.

30 Claims, 5 Drawing Sheets

(51) Int. Cl.
| | |
|---|---|
| B01J 20/16 | (2006.01) |
| B01D 61/04 | (2006.01) |
| B01D 69/02 | (2006.01) |
| B01D 71/70 | (2006.01) |
| B01J 20/28 | (2006.01) |
| B01D 61/02 | (2006.01) |
| C02F 1/28 | (2006.01) |
| C02F 1/44 | (2006.01) |
| C02F 101/20 | (2006.01) |
| C02F 101/30 | (2006.01) |
| C02F 101/32 | (2006.01) |
| C02F 101/36 | (2006.01) |
| C02F 103/36 | (2006.01) |

(52) U.S. Cl.
CPC .............. *B01D 71/70* (2013.01); *B01J 20/16* (2013.01); *B01J 20/18* (2013.01); *B01J 20/28064* (2013.01); *B01J 20/28066* (2013.01); *B01J 20/28069* (2013.01); *B01J 20/28083* (2013.01); *B01D 2311/04* (2013.01); *B01D 2325/36* (2013.01); *B01J 2220/58* (2013.01); *C02F 1/281* (2013.01); *C02F 1/44* (2013.01); *C02F 2101/20* (2013.01); *C02F 2101/30* (2013.01); *C02F 2101/32* (2013.01); *C02F 2101/325* (2013.01); *C02F 2101/36* (2013.01); *C02F 2103/365* (2013.01); *C02F 2209/20* (2013.01); *C02F 2303/20* (2013.01)

(56) References Cited

U.S. PATENT DOCUMENTS

| | | | | |
|---|---|---|---|---|
| 5,614,100 | A * | 3/1997 | Gallup | B01D 17/0202 210/665 |
| 6,416,668 | B1 * | 7/2002 | Al-Samadi | B01D 61/04 210/636 |
| 2004/0079706 | A1 | 4/2004 | Mairal | B01D 17/02 210/651 |
| 2007/0102359 | A1 * | 5/2007 | Lombardi | B01D 17/085 210/639 |
| 2007/0158272 | A1 * | 7/2007 | Vignola | C02F 1/281 210/660 |
| 2008/0053902 | A1 * | 3/2008 | Koegler | B01D 15/361 210/638 |
| 2008/0149561 | A1 * | 6/2008 | Chu | A61L 15/425 210/500.38 |
| 2008/0207822 | A1 * | 8/2008 | Yeager | C08G 65/44 524/543 |
| 2009/0101583 | A1 * | 4/2009 | Perry | B01D 61/58 210/664 |
| 2010/0051558 | A1 * | 3/2010 | Gong | B01J 20/186 210/691 |
| 2010/0147745 | A1 * | 6/2010 | Den Boestert | B01D 61/027 208/91 |

FOREIGN PATENT DOCUMENTS

| | | | | |
|---|---|---|---|---|
| WO | WO 2007001405 A2 * | 1/2007 | | B01D 65/08 |
| WO | 2010051142 A1 | 5/2010 | | |
| WO | WO 2010082069 A1 * | 7/2010 | | B01D 69/02 |

OTHER PUBLICATIONS

Hans F. Stroo and C. Herb Ward, "In Situ Remediation of Chlorinated Solvent Plumes", Springer Science and Business Media, New York, Sep. 10, 2010, 4 total pages.*

Subramani et al., "Direct Observation of initial microbial deposition onto reverse osmosis and nanofiltration membranes", Journal of Membrane Science, 319, 2008, pp. 111-125, 15 total pages.*

DOW, "Dow FILMTECTM Membranes: DOW FILMTEC NF90 Nanofiltration Elements for Commercial Systems", "Product Information", accessed from Web, Mar. 4, 2016, 2 total pages.*

Wu et al., "Enhancing the interfacial stability and solvent-resistant property of PDMS/PES composite membrane by introducing a bifunctional aminosilane", Journal of Membrane Science, 337, pp. 61-69, 2009, 9 total pages.*

Vandezande et al., "Solvent resistant nanofiltration: separating on a molecular level", Chem. Soc. Rev., 2008, 37, pp. 365-405, 41 total pages.*

Whu et al., "Nanofiltration studies of larger organic microsolutes in methanol solutions", Journal of Membrane Science, 170, 2000, pp. 159-172, 14 total pages.*

Boussu, et al., "Applicability of nanofiltration in the carwash industry", Separation and purification technology, vol. 54, No. 2, Feb. 13, 2007, pp. 139-146.

Mondal, S, et al., "Produced water treatment by nanofiltration and reverse osmosis membranes", Journal of membrane science, vol. 322, No. 1, Sep. 1, 2008, pp. 162-170.

Muraleedaaran, et al., "Is Reverse Osmosis Effective for Produces Water Purification? Viability and Economic Analysis", Retrieved from http:www.netl.doe.gov/technologies/oil-gas/publications/EPact/07123-05_SPE.pdf, retrieved on Jul. 20, 2011, pp. 1, 2.

Soondong, Kwon, et al., "Pilot Scale Test of a Procedural Water-Treatment System for Initial Removal of organic compounds", Society of Petroleum engineers, Sep. 21, 2008, pp. 1-4.

* cited by examiner

PROCESS FOR THE TREATMENT OF CONTAMINATED WATER BY MEANS OF ADSORPTION AND NANOFILTRATION

RELATED APPLICATION

This application is a National Phase filing of PCT/EP2011/069356, filed Nov. 3, 2011, and claims priority to Italian Application No. MI2010A002061, filed Nov. 5, 2010, the subject matter of which are incorporated herein by reference in their entirety.

FIELD OF THE INVENTION

The present invention relates to a process for the treatment of contaminated water.

More in particular, the present invention relates to a process for the treatment of water contaminated by polar and/or apolar organic compounds, and/or by heavy metal salts, and/or by oil dispersed or in emulsion, comprising sending said contaminated water to a system comprising at least one adsorption unit and at least one nanofiltration unit.

BACKGROUND OF THE INVENTION

Industrial waste waters that must be treated before their disposal or reuse often include contaminated waters comprising polar and/or apolar organic compounds, and/or heavy metal salts, and/or oil dispersed or in emulsion. Said waters may come from a variety of industries such as, for example, aluminium and steel production industries, chemical and/or petrochemical industries, automotive industries, oil industries.

In particular, oil industries, both during the extraction and during the refining, produce large amounts of water. For example, during the extraction, both the production water extracted along with the oil and the injection water deriving from the return to the surface, along with hydrocarbons, of the water pumped into the well for keeping pressure values to adequate levels, are produced.

Typical contaminant compounds present in waste waters deriving from oil industries, in particular in production waters and in refinery waste waters (e.g., cooling waters, wash waters, refinery ground waters), and in waste waters deriving from petrochemical industries (e.g., cooling waters, wash waters, ground waters from petrochemical industries), are shown in Table 1.

TABLE 1

| CLASSES OF CONTAMINANT COMPOUNDS | EXAMPLES OF CONTAMINANT COMPOUNDS |
|---|---|
| Polar and apolar organic compounds | Aliphatic hydrocarbons; carboxylic acids; optionally halogenated phenols; optionally halogenated aromatic compounds; glycols; alcohols; ethers (MTBE, ETBE); aldehydes; ketones; halogenated solvents. |
| Oil dispersed or in emulsion | Polyaromatic hydrocarbons; alkyl-phenols. |
| Dissolved minerals | Salts containing $Na^+$, $K^+$, $Ca^{2+}$, $Mg^{2+}$, $Ba^{2+}$, $Sr^{2+}$, $Fe^{2+}$, as cations, and $Cl^-$, $SO_4^-$, $CO_3^{2-}$, $HCO_3^-$, as anions. Heavy metal salts such as Cd, Cr, Cu, Pb, Hg, Ni, Ag, Zn. NORM (natural radioactive substances). |

TABLE 1-continued

| CLASSES OF CONTAMINANT COMPOUNDS | EXAMPLES OF CONTAMINANT COMPOUNDS |
|---|---|
| Chemical additives | Corrosion and scale inhibitors; biocides; emulsifiers; anti-foam agents. |
| Suspended solids | Limescale; waxes; microorganisms; asphaltenes; iron oxides. |
| Dissolved gases | Carbon dioxide; oxygen; hydrogen sulphide. |

Treatments for the removal of the above-mentioned contaminant compounds are known in the art. Examples of said treatments are shown in Table 2.

TABLE 2

| TREATMENT TYPES | TREATMENT EXAMPLES |
|---|---|
| Physical | Adsorption on active carbon (GAC), zeolites, resins; dissolved air precipitation; C-tour; cyclones; evaporation; sand filters; electrodialysis; freezing-defrosting/evaporation; treatment with membranes (MF, UF, NF, RO). |
| Chemical | Precipitation; oxidation; electrochemical processes; photo-catalytic processes; Fenton process; ozone; room temperature ionic liquids; emulsifiers. |
| Biological | Aerobic processes; anaerobic processes. |

The above-mentioned physical and/or chemical treatments are generally carried out in offshore plants where spaces are limited and compact technologies can be used. However said treatments, besides having high costs, may exhibit some drawbacks. In fact, said treatments are not always totally effective in removing both the above-mentioned polar or apolar organic compounds and the above-mentioned dissolved minerals, as well as the above-mentioned oil dispersed or in emulsion.

On the other hand, the above-mentioned biological treatments are generally carried out in onshore plants. However, said biological treatments, generally less expensive and more effective compared to the above-mentioned physical and/or chemical treatments, cannot always be carried out, in particular, in the presence of:

high salt concentrations that strongly inhibit the activity of the micro-organisms used;
substances that are toxic for the biomass (e.g., benzene);
organic substances that are hardly biodegradable (e.g., MTBE).

Moreover, said biological treatments generally require the management of large volumes of muds produced.

Finally, further problems may result from a secondary pollution due to the use of chemical additives that may be used in order to control the above-mentioned chemical, physical and/or biological treatments.

Treatments of contaminated water using microporous alumino-silicates, i.e. zeolites, are described in the art.

For example, US patent application 2004/0206705 describes a process for the treatment of water contaminated by apolar compounds characterised in that the treatment is performed on contaminated ground water and consists in making the water pass through a permeable reactive barrier (PRB), placed in situ perpendicular to the ground water, wherein the reactive means consists of one or more apolar zeolites having a silica/alumina ratio higher than 50 and having structural channels (i.e. pores) of a size similar to that of the molecules of the contaminant compounds. The above-mentioned process is said to be capable of removing the contaminant apolar compounds effectively and selectively compared to the mineral salts normally dissolved in water.

U.S. Pat. No. 7,341,665 describes a process for the treatment of water contaminated by apolar organic compounds and/or by heavy metals which consists in circulating the water through a system comprising at least two types of zeolites having a silica/alumina ratio higher than 50, places in a succession, wherein the first zeolite wherethrough the water is made to pass is characterised by a high adsorption capability and by structural channels (i.e. pores) of a size ranging from 7 Å to 50 Å, and the second zeolite is characterised by a high capability of molecule removal with molecular diameter comparable to the dimension of the structural channels (i.e. pores) thereof ranging from 5 Å to 7 Å. The above-mentioned process is said to be capable of removing contaminant apolar organic compounds in an effective manner, both if they are present in small amounts and if they are present in large amounts, thanks to the synergic effect of the two zeolites.

Treatments of contaminated water using membranes are also described in the art.

For example, Visvanathan et al., in the article "Volume reduction of produced water generated from natural gas production process using membrane technology", published in "Water Science and Technology" (2000), Vol. 41, pages 117-123, describe a process for the treatment of produced water generated from the natural gas production process, comprising sending said produced water to a pre-treatment unit comprising an ultrafiltration membrane (UF), or a nanofiltration membrane (NF), obtaining a permeate and a retentate; sending the permeate obtained from the pre-treatment unit to a treatment unit comprising a reverse osmosis (RO) membrane. The above-mentioned pre-treatment is said to be required in order to prevent the fouling of the reverse osmosis (RO) membrane.

Mondal et al. in the article "Produced water treatment by nanofiltration and reverse osmosis membranes", published in "Journal of Membrane Science" (2008), Vol. 322, pages 162-170, describe the treatment of produced water co-produced during the production of oil or gas, through a nanofiltration (NF) or reverse osmosis (RO) membrane. In particular, the following membranes have been tested:
  NF 270: thin film composite membrane based on piperazine and semi-aromatic polyamide [nanofiltration (NF)];
  NF 90: thin film composite membrane based on aromatic polyamide [nanofiltration (NF)];
  BW 30: thin film composite membrane based on aromatic polyamide [reverse osmosis (RO)].

The tests showed a fouling of the membranes. The reverse osmosis (RO) membrane BW 30 produced the best quality permeate compared to the nanofiltration (NF) membranes NF 270 and NF 30.

Ahmadun et al., in the review "Review of technologies for oil and gas produced water treatment", published in "Journal of Hazardous Materials" (2009), Vol. 170, pages 530-551, describe several treatment techniques for produced water deriving from oil and gas industry. Among these there are described, for example, treatment techniques through microfiltration membranes (MF), ultrafiltration membranes (UF), nanofiltration membranes (NF), reverse osmosis (RO) membranes.

U.S. Pat. No. 5,028,336 describes a method for the treatment of water (e.g., production water deriving from the production of oil or gas) having low pH and containing water-soluble dissolved organic electrolytes, which comprises: raising the pH of said water so as to obtain an alkalized water containing water-soluble dissolved organic electrolytes; subjecting said alkalized water containing water-soluble dissolved organic electrolytes to nanofiltration so as to obtain (i) an aqueous retentate containing a higher concentration of water-soluble dissolved organic electrolytes and (ii) an aqueous permeate containing a lower concentration of water-soluble dissolved organic electrolytes; recovering said aqueous retentate containing a higher concentration of water-soluble dissolved organic electrolytes; and recovering said aqueous permeate containing a lower concentration of water-soluble dissolved organic electrolytes. The above-mentioned treatment is said to be capable of effectively removing the water-soluble dissolved organic electrolytes present in said water.

However, the above reported processes may exhibit some drawbacks. In fact, the above-mentioned processes are not always capable of giving the desired results.

On the one hand, the processes using microporous alumino-silicates (e.g., zeolites) do not allow an effective removal of polar organic compounds having a small number of carbon atoms (e.g., a number of carbon atoms lower than or equal to 8), in particular in the case of oxygenated polar organic compounds such as alcohols, glycols, aldehydes, ketones and carboxylic acids. Moreover, the use of said microporous alumino-silicates does not allow an effective removal of heavy metal salts and of the oil dispersed or in emulsion.

On the other hand, the processes using membranes do not always allow an effective removal of apolar organic compounds such as, for example, benzene, ethylbenzene, toluene, xylenes (known as BTEX), which are aggressive towards said membranes. In particular, high concentrations of said compounds (e.g., concentrations higher than or equal to 10 ppm) may cause a depolymerization of the membranes, thus making them unusable for the purpose.

BRIEF SUMMARY OF THE INVENTION

The Applicant has thus faced the problem of finding a process for the treatment of water contaminated by polar and/or apolar organic compounds, and/or by heavy metal salts, and/or by oil dispersed or in emulsion, capable of effectively removing both organic compounds with a low and high number of carbon atoms, and heavy metal salts, as well as the oil dispersed or in emulsion.

The Applicant has now found that by subjecting said contaminated water to a treatment comprising sending said contaminated water to a system comprising at least one adsorption unit including at least one microporous or mesoporous alumino-silicate and at least one nanofiltration unit including at least one hydrophilic nanofiltration membrane having specific features, it is possible to effectively remove both said polar and/or apolar organic compounds and said heavy metal salts, as well as said oil dispersed or in emulsion, preventing the above problems of membrane depolymerization. In particular, the treatment with said microporous or mesoporous alumino-silicate allows removing both polar organic compounds having a number of carbon atoms higher than 8, and apolar organic compounds, present in said contaminated water, both at a low and at a high concentration (e.g., at a concentration ranging from 1 ppm to 30000 ppm), whereas the nanofiltration treatment allows removing polar organic compounds having a number of carbon atoms lower than or equal to 8 carbon atoms, more in particular oxygenated organic compounds such as alcohols, glycols, aldehydes, ketones, carboxylic acids, present in said contaminated water both at a low and at a high concentration (e.g., at a concentration ranging from 1 ppm to 30000 ppm). Moreover, the treatment with said microporous or mesoporous alumino-silicate allows preventing the fouling of the hydrophilic nanofiltration membrane and consequently, obtaining a lengthening of the membrane life and functionality and a saving in both time and costs. Moreover, the treatment with said mesoporous alumino-silicate allows effectively removing the oil dispersed or in emulsion. Moreover, said nanofiltration treatment allows eliminating heavy metal salts.

The above-mentioned treatment allows ensuring a high quality of the final effluent. In fact, the water obtained at the end of said treatment, allows obtaining the removal of polar and/or apolar organic compounds at levels defined by the regulatory limits according to law decree 152/2006, without needing any further treatments.

DETAILED DESCRIPTION OF THE INVENTION

Figure 1:
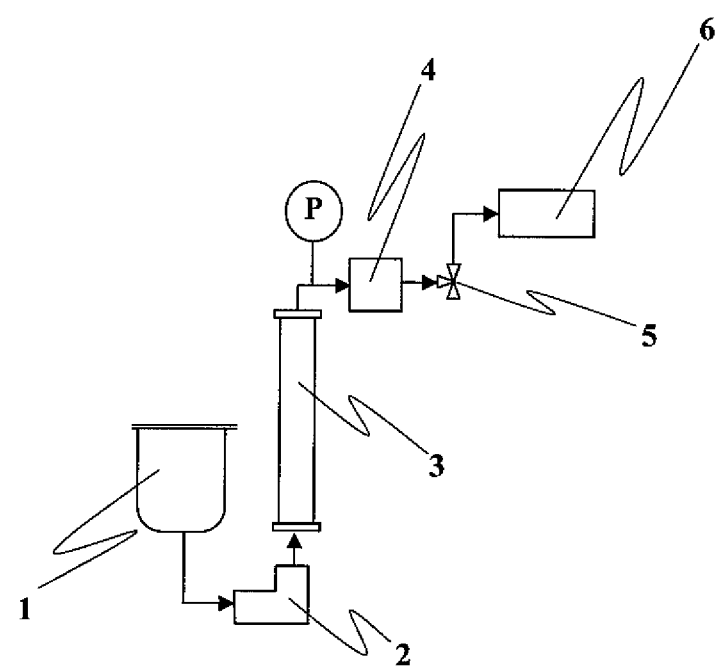
FIG. 1 represents the pilot plant diagram of an adsorption unit for use in a process for the treatment of contaminated water.

The object of the present invention therefore is a process for the treatment of water contaminated by polar and/or apolar organic compounds, and/or by heavy metal salts, and/or by oil dispersed or in emulsion, comprising sending said contaminated water to a system comprising:
  at least one adsorption unit including at least one microporous or mesoporous alumino-silicate;
  at least one nanofiltration unit including at least one hydrophilic nanofiltration membrane;
wherein said hydrophilic nanofiltration membrane has a contact angle with water lower than or equal to 45°, preferably ranging from 25° to 40°.

Said "contact angle" has been measured as described by Geens et al. in article "Polymeric nanofiltration of binary water-alcohol mixtures: Influence of feed composition and membrane properties on permeability and rejection", published in "Journal of Membrane Science" (2005), Vol. 255, pages 255-264.

For the purpose of the present description and of the following claims, the definitions of the numerical intervals always comprise the extremes, unless otherwise specified.

For the purpose of the present description and of the following claims, the term "adsorption unit" denotes the entire apparatus required for performing the adsorption typically comprising at least one feeding tank, at least one feeding pump, at least one adsorption column comprising at least one microporous or mesoporous alumino-silicate, at least one detector for monitoring the total organic carbon (TOC) contents. Further details related to said adsorption unit are shown below (Materials and Methods Used).

For the purpose of the present description and of the following claims, the term "nanofiltration unit" denotes the entire apparatus required for performing the nanofiltration typically comprising at least one feeding tank, at least one feeding pump, at least one nanofiltration vessel including at least one hydrophilic nanofiltration membrane, at least one collection tank. Further details related to said nanofiltration unit are shown below (Materials and Methods Used).

According to a preferred embodiment of the present invention, said contaminated water may be selected from: production water deriving from oil or gas wells; injection water deriving from the return to the surface, together with hydrocarbons, of the water pumped into the well for maintaining pressure values at adequate levels; refinery water; water deriving from petrochemical industries; groundwater from refining and/or from petrochemical industries.

According to a preferred embodiment of the present invention, said adsorption unit and said nanofiltration unit are positioned in succession.

According to a further preferred embodiment of the present invention, said adsorption unit is positioned before said nanofiltration unit.

According to a preferred embodiment of the present invention, said polar organic compounds may be: alcohols such as, for example, methanol, ethanol, 1-propanol, iso-propanol, 1-butanol, iso-butanol, tert-butanol; ketones such as, for example, acetone, 2,3-butandione, 3-hydroxy-2-butanone, methyl-ethyl-ketone, methyl-propyl-ketone, methyl-butyl-ketone, pentan-2-one, pentan-3-one; glycols such as, for example, ethyleneglycol, diethyleneglycol, triethyleneglycol; carboxylic acids such as, for example, acetic acid, propionic acid, butanoic acid, pentanoic acid, hexanoic acid, or their methyl-substitutes; aldehydes such as, for example, acetaldehyde, butanealdehyde, pentanealdehyde, hexanealdehyde, or their methyl-substitutes; or mixtures thereof.

According to a preferred embodiment of the present invention, said polar organic compounds may be present in said contaminated water in an amount ranging from 1 ppm to 30000 ppm, preferably ranging from 2 ppm to 20000 ppm.

According to a preferred embodiment of the present invention, said apolar organic compounds may be: halogenated solvents such as, for example, tetrachloroethylene (PCE), trichloroethylene (TCE), dichloroethylene (DCE), vinylchloride (VC); aliphatic and/or aromatic compounds such as, for example, methyl-t-butylether (MTBE), ethyl-t-butylether (ETBE), benzene, toluene, ethylbenzene, xylenes (known as BTEX); phenols; naphthalenes; α- and β-naphthols; anthracenes; linear aliphatic hydrocarbons having from 16 to 30 carbon atoms; or mixtures thereof.

According to a preferred embodiment of the present invention, said apolar organic compounds may be present in said contaminated water in an amount ranging from 1 ppm to 30000 ppm, preferably ranging from 2 ppm to 20000 ppm.

According to a preferred embodiment of the present invention, said heavy metal salts may be: chlorides, sulfates, carbonates, bicarbonates, borates, of arsenic, of chromium, of antimonium, of selenium, of mercury, of cadmium, of cobalt, of nickel, of lead, of manganese, of copper, of zinc; or mixtures thereof.

According to a further preferred embodiment of the present invention, said heavy metal salts may be present in said contaminated water in an amount ranging from 0.1 ppm to 40000 ppm, preferably ranging from 1 ppm to 20000 ppm.

According to a further preferred embodiment of the present invention, said contaminated water may comprise salts of alkaline or alkaline-earth metals such as, for example, chlorides, sulfates, carbonates, bicarbonates, borates, of sodium, of potassium, of calcium, of magnesium, of barium, of strontium, of iron; or mixtures thereof.

According to a further preferred embodiment of the present invention, said salts of alkaline or alkaline-earth metals may be present in said contaminated water in an amount ranging from 0.1 ppm to 40000 ppm, preferably ranging from 1 ppm to 20000 ppm.

According to a preferred embodiment of the present invention, said oil dispersed or in emulsion is a complex mixture comprising: linear, branched or cyclic aliphatic hydrocarbons, such as, for example, n-heptane, 2,4,4-trimethyl-1-pentane, 2-methylhexane, n-octane, 2,4-dimethylhexane, methylcyclohexane, methylcyclohexene; aromatic hydrocarbons such as, for example, benzene, toluene, ethylbenzene and xylenes (known as BTEX), phenols, alkylphenols; aromatic polycyclic hydrocarbons (known as IPAs or PAHs) such as, for example, naphthalene, phenanthrene, pyrene, benzopyrene, benzoanthracene. Moreover, sulfurated compounds (for example, sulphides, disulphides, benzothiophene, dibenzothiophene), nitrogenated compounds (for example, quinolines, pyridines), oxygenated compounds (for example, fat acids, naphthenic acids), besides traces of metals (for example, nickel, vanadium, cobalt, chromium, cadmium, lead, arsenic, mercury), are generally present in said oil.

According to a preferred embodiment of the present invention, said oil dispersed or in emulsion may be present in said contaminated water in an amount ranging from 50 ppm to 500 ppm, preferably ranging from 100 ppm to 400 ppm.

According to a further preferred embodiment of the present invention, said contaminated water may comprise other contaminants such as, for example, chemical additives usually used during the drilling of wells.

According to a preferred embodiment of the present invention, said microporous alumino-silicate may be selected from zeolites having an average pores diameter ranging from 3.5 Å to 7.5 Å, preferably ranging from 4.5 Å to 7 Å.

According to a preferred embodiment of the present invention, said zeolites may have a silica/alumina molar ratio (SAR) ranging from 2 to 500, preferably ranging from 20 to 300.

According to a preferred embodiment of the present invention, said zeolites may be selected from silicalite, zeolite ZSM-5, zeolite Y, mordenite, beta zeolite, ferrierite, or mixtures thereof. Zeolite Y is preferred.

According to a preferred embodiment of the present invention, said mesoporous alumino-silicate may have an average pores diameter ranging from 25 Å to 500 Å, preferably ranging from 30 Å to 200 Å.

According to a preferred embodiment of the present invention, said mesoporous alumino-silicate may have a silica/alumina molar ratio (SAR) ranging from 30 to infinite, preferably higher than or equal to 100.

According to a preferred embodiment of the present invention, said mesoporous alumino-silicate may have a pores volume ranging from 0.3 ml/g to 1.3 ml/g, preferably ranging from 0.5 ml/g to 1.1 ml/g.

According to a preferred embodiment of the present invention, said mesoporous alumino-silicate may have a specific surface area ($S_{BET}$) higher than or equal to 500 m$^2$/g, preferably ranging from 600 m$^2$/g to 1200 m$^2$/g.

According to a preferred embodiment of the present invention, said mesoporous alumino-silicate may have a completely amorphous structure.

According to a further preferred embodiment of the present invention, said mesoporous alumino-silicate material may have a substantially amorphous structure.

For the purpose of the present description and of the following claims, the term "substantially amorphous structure" denotes a mesoporous material that despite being composed of amorphous silica, has an ordered structure with even pores organised as a hexagonal net having a honeycomb-like structure.

Completely amorphous mesoporous alumina-silicates that may advantageously be used for the purpose of the present invention, may be selected among the mesoporous silica-aluminas of the MSA type described, for example, in european patents EP 659,478 and EP 812,804 and in U.S. Pat. No. 5,049,536. Their XRD ("X-ray diffractometry") spectrum obtained from dusts shows a completely amorphous structure. The above-mentioned patents also describe various processes for preparing said mesoporous silica-aluminas.

As an alternative, completely amorphous mesoporous alumina-silicates that may advantageously be used for the purpose of the present invention may be selected among mesoporous alumina-silicates of the type:

MSU described for example by Bagshaw et al. in: "Science" (1995), Vol. 269, pages 1242-1244;

KIT-1 described for example by Ryoo et al. in: "Studies in Surface Science and Catalysis" (1997), Vol. 105, pages 45-52.

Substantially amorphous mesoporous alumino-silicates that may advantageously be used for the purpose of the present invention may be selected among mesoporous alumina-silicates of the type M41-S (for example, the mesoporous alumino-silicate named MCM-41) described, for example, by Beck J. S. et al. in: "Journal of American Chemical Society" (1992), Vol. 114, pages 10834-10843. In particular, among the mesoporous alumina-silicates of the type M41-S, it is possible to select those of the type MCM described for example in international patent application WO 91/11390. Their XRD ("X-ray diffractometry") spectrum obtained from dusts shows an ordered structure with even pores organised as a hexagonal net having a honeycomb-like structure.

As an alternative, substantially amorphous mesoporous alumino-silicates that may advantageously be used for the purpose of the present invention, may be selected among mesoporous alumina-silicates named:

FSM-16 described, for example, by Inagaki S. et al. in: "Journal of Chemical Society", "Chemical Communication" (1993), pages 680-682;

HMS-3 described, for example, by Tuel et al. in: "Chemistry of Materials" (1996), Vol. 8, pages 114-122;

SBA described, for example, by Huo et al. in: "Chemistry of Materials" (1996), Vol. 8, pages 1147-1160.

As said above, it should be noted that for the purpose of the present invention, the use of a mesoporous alumino-silicate is particularly recommended if oil dispersed or in emulsion is present.

For the purpose of the present invention, said microporous or mesoporous alumino-silicate may be used in various forms. In particular, said microporous or mesoporous alumino-silicate may be formed by performing any extrusion, spherulization, tabletting, granulation process, known in the art.

According to a preferred embodiment of the present invention, said contaminated water may be kept in contact with said microporous or mesoporous alumino-silicate ("empty bed contact time") for a time ranging from 1 minute to 5 hours, preferably ranging from 2 minutes to 4 hours.

According to a preferred embodiment of the present invention, said hydrophilic nanofiltration membrane may have a permeability to water, measured at 22° C., ranging from 0.5 l/(m²×h×bar) to 5 l/(m²×h×bar), preferably ranging from 1 l/(m²×h×bar) to 3 l/(m²×h×bar).

According to a preferred embodiment of the present invention, said hydrophilic nanofiltration membrane may have a surface energy ranging from 40 mN/m to 80 mN/m, preferably ranging from 50 mN/m to 75 mN/m.

According to a preferred embodiment of the present invention, said hydrophilic nanofiltration membrane may have a maximum operating temperature ranging from 15° C. to 50° C., preferably ranging from 20° C. to 45° C.

According to a preferred embodiment of the present invention, said hydrophilic nanofiltration membrane may have a maximum operating pressure ranging from 5 bar and 45 bar, preferably ranging from 10 bar e 40 bar.

According to a preferred embodiment of the present invention, said hydrophilic nanofiltration membrane may have a molecular weight cut-off (MWCO) ranging from 150 dalton to 300 dalton, preferably ranging from 200 dalton to 280 dalton.

According to a preferred embodiment of the present invention, said hydrophilic nanofiltration membrane may have a maximum operating pH ranging from 1 to 12, preferably ranging from 1.5 to 11.

According to a preferred embodiment of the present invention, said hydrophilic nanofiltration membrane may be selected from polymeric membranes comprising polyalkylsiloxanes, preferably polydimethylsiloxanes. Said polyalkylsiloxanes may be cross-linked or non-cross-linked, preferably cross-linked.

Hydrophilic nanofiltration membranes that may advantageously be used for the purpose of the present invention are the products known by the trade names SelRO® MPS-44 (series 2540, 4040, 8040) by Koch Membrane Systems.

The above-mentioned hydrophilic nanofiltration membranes may be in the form of homogeneous membranes, asymmetrical membranes, multilayer composite membranes, matrix membranes incorporating a gel layer or a liquid layer, or in any other form known in the art. Preferably, they are in the form of multilayer composite membranes comprising a base layer, a porous support layer and a layer comprising at least one of the polymers reported above. Base layers useful for the purpose are, in general, flexible and high porosity woven or non-woven fabrics, comprising fibres including metal fibres, polyolefin fibres, polysulfone fibres, polyetherimide fibres, polyphenylene sulphide fibres, carbon fibres, or mixtures thereof; porous structures comprising glass, ceramic, graphite, metals are equally useful. The porous support layer preferably has an asymmetrical porous structure. Said porous support layer may be produced, for example, from polyacrylonitrile, polysulfone, polyethersulfone, polyetherimide, polyvinylidenefluoride, hydrolyzed cellulose triacetate, polyphenylene sulphide, polyacrylonitrile, polytetrafluoroethylene, polyethylene, polyvinyl alcohol, copolymers of trifluoride polyolefins, or other useful polymers, or mixtures thereof.

The above-mentioned hydrophilic nanofiltration membranes may be in the form of flat sheets, empty fibres, tubular membranes, spiral wound membranes, or other useful forms.

According to a preferred embodiment of the present invention, the specific flow (kg of permeate per square meter of surface of the hydrophilic nanofiltration membrane per hour) may range from 0.5 kg/(m²×h) to 50 kg/(m²×h), preferably ranging from 0.8 kg/(m²×h) to 30 kg/(m²×h).

According to a preferred embodiment of the present invention, said contaminated water may be sent to said system at a temperature ranging from 10° C. to 40° C., preferably ranging from 15° C. to 30° C.

According to a preferred embodiment of the present invention, said contaminated water may be sent to said system at a pH ranging from 1 to 12, preferably ranging from 2 to 10.

According to a preferred embodiment of the present invention, said contaminated water may be sent to said system at a pressure ranging from 0.5 bar to 35 bar, preferably ranging from 0.8 bar to 25 bar.

Materials and Methods Used

Adsorption Unit

The experiment was carried out on a pilot plant (i.e. adsorption unit) using a glass column with Teflon® (DuPont) supports and connections containing at least one microporous or mesoporous alumino-silicate.

FIG. 1 shows the pilot plant diagram (i.e. adsorption unit) used which is composed as follows:
- a feeding tank (1) having a capacity equal to about 100 l;
- a peristaltic feeding pump (2);
- a glass column (3) containing a microporous aluminosilicate;
- a pressure gauge (P) intended for controlling the operating pressure;
- a detector for monitoring the total organic carbon (TOC) contents (4);
- a three-way valve (5);
- a fraction collector (6).

Said plant operates with a feeding rate equal to 1 l/day. The operating temperature was set to 20° C.

An operating pressure equal to 1 bar was used and the pH of the solutions was kept equal to 7.

Nanofiltration Unit and Hydrophilic Nanofiltration Membranes

The experiment was carried out on a pilot plant (i.e. nanofiltration unit) equipped with a stainless steel vessel for nanofiltration capable of containing at least one wound spiral hydrophilic nanofiltration membrane having a diameter equal to 61 mm, an area equal to 1.6 m², and characterised by a high surface/volume ratio.

Figure 2:
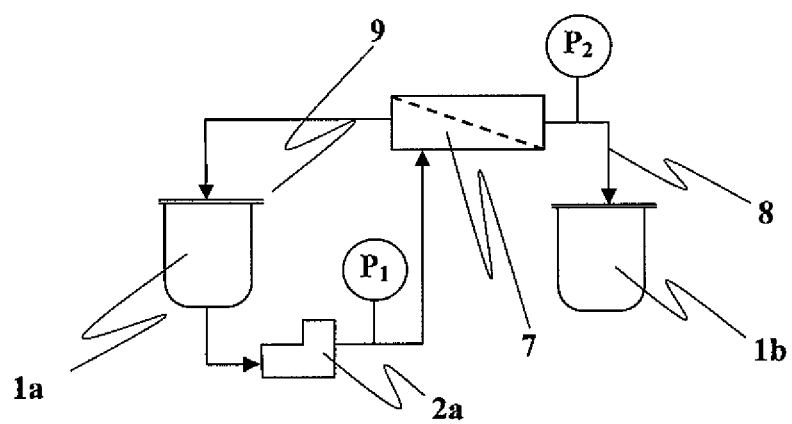
FIG. 2 represents the pilot plant diagram of a nanofiltration unit for use in a process for the treatment of contaminated water.

FIG. 2 shows the pilot plant diagram (i.e. nanofiltration unit) used which is composed as follows:
- a feeding tank (1*a*) having a capacity equal to about 300 l;
- a peristaltic feeding pump (2*a*);
- two pressure gauges ($P_1$) and ($P_2$) intended for controlling the incoming and outgoing pressure into/from the stainless steel vessel for nanofiltration (7);

a stainless steel vessel for nanofiltration (7) comprising a hydrophilic nanofiltration membrane;

a collection tank (1b).

FIG. 2 also shows the permeate (8) and the retentate (9). Said plant operates with a feeding rate equal to 800 l/h.

The feeding is cross-flow and allows reducing the phenomena associated to the fouling of the hydrophilic nanofiltration membrane, both chemical and physical. The operating temperature was set to 20° C.

Two operating pressures were used: 10 bar and 20 bar, and the pH of the solutions was kept equal to 7.

The hydrophilic nanofiltration membrane used is a spiral wound composite membrane and consists of a series of pairs of flat membranes glued to one another on three sides and with the fourth side connected to a central channel for collecting the permeate; the membranes are then wound around such channel. The two membrane sheets are separated by a spacing grid for draining the permeate. The grid is also mounted on the feeding side (between the pairs of membranes) and it contributes to creating an additional turbulence that allows a reduction of the polarisation concentration [theoretically, the motion is of the laminar type, with Re (i.e. Reynolds number) generally ranging from 100 to 3000].

The surface/volume ratios are quite high, generally ranging from 700 $m^2/m^3$ to 1000 $m^2/m^3$.

The chemical-physical features of the hydrophilic nanofiltration membrane used SelRO® MPS-44 (series 2540) (Koch) are shown in Table 3.

TABLE 3

| | |
|---|---|
| Active material | Polydimethylsiloxane |
| Active area ($m^2$) | 1.6 |
| Maximum operating temperature (° C.) | 40 |
| Maximum operating pressure (bar) | 35 |
| pH (20° C.) | 2-10 |
| Contact angle in water (°) | 34.2 |
| Molecular Weight Cut-Off (Dalton) | 250 |
| Surface energy (mN/m) | 68.1 |
| Charge (at neutral pH) | Negative |
| Permeability to water at 22° C. [l/($m^2$ × h × bar)] | 1.3 |
| Stability to solvents | High in water-organic solvent |

For comparative purpose, the hydrophilic nanofiltration membrane Desal®-5-DL (General Electrics Osmotic) was used: the chemical-physical features are shown in Table 4.

TABLE 4

| | |
|---|---|
| Active material | Aromatic polyamide |
| Active area ($m^2$) | 1.77 |
| Maximum operating temperature (° C.) | 50 |
| Maximum operating pressure (bar) | 42 |
| pH (20° C.) | 1-11 |
| Contact angle in water (°) | 49.4 |
| Molecular Weight Cut-Off (Dalton) | 150-300 |
| Surface energy (mN/m) | 59.7 |
| Charge (at neutral pH) | Negative |
| Permeability to water at 22° C. [l/($m^2$ h bar)] | 3.6 |
| Stability to solvents | High in water-organic solvent |

The degree of separation that can be achieved with a hydrophilic nanofiltration membrane, and therefore the performance thereof, towards a predetermined solute, is expressed by the percent rejection:

$$R(\%) = (1 - C_p/C_r) \times 100$$

wherein $C_p$ and $C_r$ are the concentrations of the solute in the permeate and of the solute in the retentate, respectively.

The sampling for measuring the concentrations was carried out at balance. Each test lasted from 2 hours to 4 hours, with sampling every hour.

Treatment System According to the Present Invention

Figure 3:
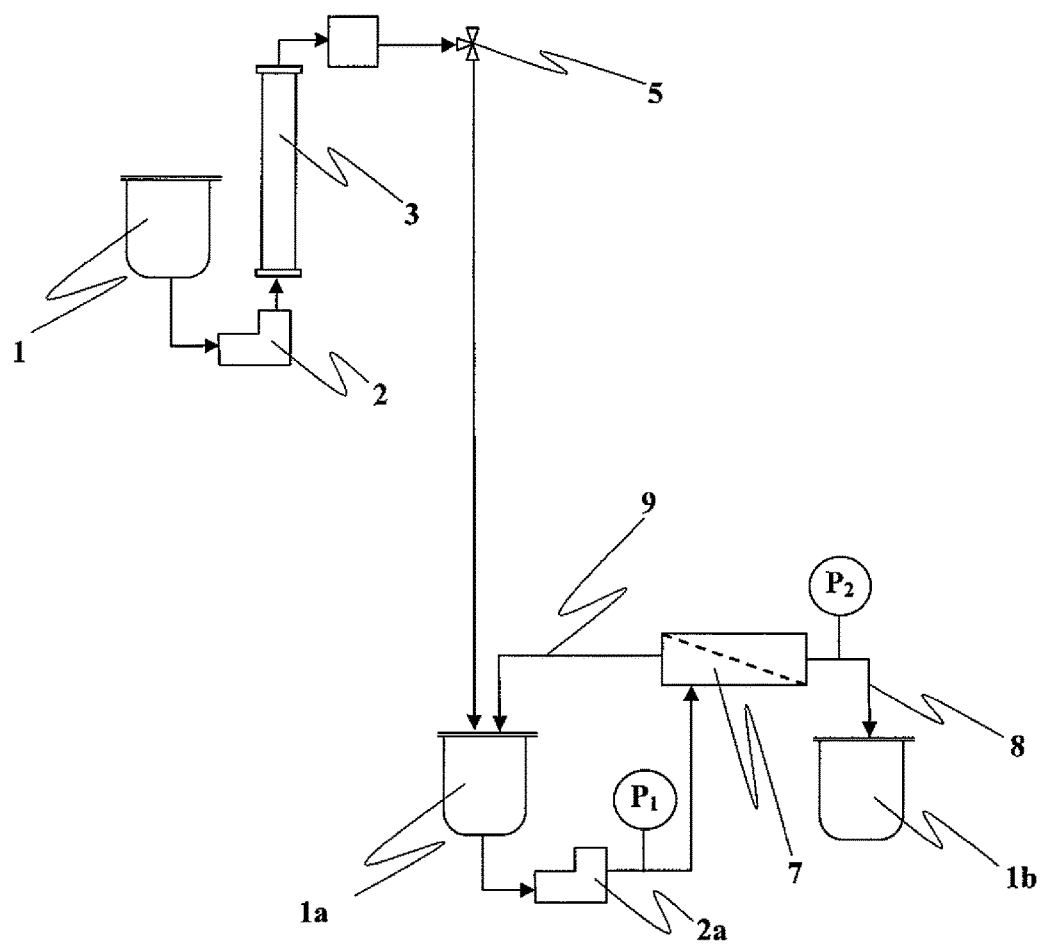
FIG. 3 shows a system comprising an adsorption unit and a filtration unit according to the present invention

FIG. 3 shows a system comprising an adsorption unit and a filtration unit according to the present invention: numerals and letters used have the same meaning mentioned above in the description of FIG. 1 and of FIG. 2. FIG. 3 does not show the fraction collector (6) present in the adsorption unit shown in FIG. 1, since the water treated in said adsorption unit is directly sent to the feeding tank (1a) of the nanofiltration unit.

Analytical Methods

The waters were characterised with qualitative and quantitative assays of both the organic compounds present in the space at the head (volatile organic compounds—method EPA 5021), and of the organic compounds extracted with solvents (less volatile organic compounds—method EPA 3510 C).

The qualitative assay for a preliminary identification of the prevailing organic compounds was carried out through gas chromatography associated with mass spectrometry (GC-MS).

The quantitative assay was carried out with two methods: a gas chromatographic one (GC) (method EPA 8041 and method EPA 8015) that refers to the most representative classes of organic compounds, for example phenol-equivalent, and a chemical one whereby the organic compounds present are quantified in terms of total organic carbon (TOC) contents (method EPA 415.1).

Low molecular weight oxygenated organic compounds such as alcohols, glycols, aldehydes, ketones and carboxylic acids were quantified by methods ASTM E202 and EPA 8260B.

The equipment used for the assays were as follows:

gas chromatograph "Purge and Trap" (HP 6890 Agilent) with a FID detector, split-splitless injector and equipped with a capillary column DB WAXetr (PEG) (length 30 m, diameter 320 µm, film thickness 1 µm);

gas chromatograph "Head Space" (HP 5890 series II with sampler Agilent 7694) with a FID detector, split-splitless injector and equipped with a column HP-5 (length 30 m, diameter 320 µm, film thickness 0.25 µm);

analyser IL550 TOC-TN (Hach) for analysing the total organic carbon (TOC) contents;

conductimeter (mod. 160, Amel Instruments) for measuring the conductivity and thus the saline concentrations;

polarograph EcaMon 1OS by Instran, equipped with a three-electrode cell: carbon operating electrode, platinum auxiliary electrode and Ag/AgCl reference electrode for analysing zinc, cadmium, lead and copper;

atomic absorption 220 FS Varian, with graphite burner atomiser;

pH meter mod. 632 (Metrohm Herisan).

In order to better understand the present invention and to put the same into practice, below are a few illustrative examples that are in no case to be considered as limiting the extent of the same invention.

Example 1

Treatment of Production Water with Zeolites

Production water was used having a total organic carbon (TOC) content equal to 461 mg/liter.

The amount of phenol-equivalent compounds equal to 30 ppm was identified in said water, through quantitative assay.

The zeolites shown in Table 5 were tested. Said zeolites were evaluated through an experiment performed using the pilot plant shown in FIG. 1.

A glass column (3) with Teflon® (DuPont) supports and connections was used for the purpose, having a diameter of 2.5 cm and length of 30 cm, containing 170 g zeolite. The column was fed with said production water at a temperature equal to 20° C., at an operating pressure equal to 1 bar and at pH 7, through the peristaltic pump (2), with a water flow equal to 1 liter/day in order to have an empty bed contact time of 3.5 hours.

After 24 hours of elution, treated water samples were taken from the fraction collector (6) to analyse the remaining compounds therein: the results obtained are shown in Table 5.

TABLE 5

| Zeolite | SAR | TOC (mg/l) | Phenol-equivalent (ppm) |
|---|---|---|---|
| None (sample as such) | — | 461 | 30 |
| Zeolite Y CBV 100[1] | 5 | 446 | 0.353 |
| Zeolite Y CBV 720[1] | 30 | 150 | 0.264 |
| Zeolite Y CBV 712[1] | 12 | 447 | 16.34 |
| ZSM-5[1] | 280 | 388 | 0.10 |
| Mordenite[2] | 200 | 365 | 0.849 |
| Zeolite FCC[3] | 10 | 476 | 0.197 |
| Zeolite Y CBV 780[1] | 80 | 428 | 0.281 |

[1]zeolite by Zeolyst;
[2]zeolite by Tosoh;
[3]zeolite by Grace.

The above reported data show that the organic compounds are not totally removed: in fact, the values of the total organic carbon (TOC) contents show the presence of organic compounds The water obtained from the treatment with Zeolite Y CBV 720 was subjected to qualitative and quantitative assay in order to determine the organic compounds still present: the data obtained are shown in Table 6.

TABLE 6

| Organic compound | Concentration (ppm) |
|---|---|
| ethyleneglycol | 31.6 |
| acetone | 18.2 |
| 1-propanol | 19.7 |
| triethyleneglycol | 59.0 |
| methanol | 34.9 |
| ethanol | 35.18 |
| acetic acid | 49.02 |

The removal of the organic compounds shown in Table 6 may be carried out, as shown by the examples below, sending said water to the nanofiltration unit.

Example 2

Treatment of Production Water with Zeolites

Production water was used having a total organic carbon (TOC) content equal to 4185 mg/liter.

The amount of phenol-equivalent compounds equal to 30.59 ppm was identified in said water, through quantitative assay.

Said production water was also subject to gas chromatographic analysis associated with mass spectrometry (GC-MS) and said analysis was completed by the analysis of the extract with ethyl ether of the emulsion (including the supernatant) after acidification at pH 2, operating according to what described in: "Standard Methods for the Examination of Water and Wastewater" (1998), 20$^{th}$ Edition, Method No. 5560: the results obtained are shown in Table 7. Operating according to said Method No. 5560, the organic compounds present in said production water are transformed into the corresponding acids, thus providing indications on the origin of the total organic carbon (TOC) contents and in particular, on the length of the carbon atom chain contained therein.

TABLE 7

| Organic acid | Concentration (ppm) |
|---|---|
| acetic acid | 2200 |
| propionic acid | 24 |
| isobutyric acid | 36 |
| butyric acid | 3600 |
| n-valeric acid | 4 |
| caproic acid | 450 |

The above reported data show the clear chemical complexity of the mixture of organic compounds present in the production water and the amount of organic compounds having 2 to 6 carbon atoms.

The zeolites shown in Table 8 were tested. Said zeolites were evaluated through an experiment performed using the pilot plant shown in FIG. 1.

A glass column (3) with Teflon® (DuPont) supports and connections was used for the purpose, having a diameter of 2.5 cm and length of 30 cm, containing 170 g of zeolite. The column was fed with said production water at a temperature equal to 20° C., at an operating pressure equal to 1 bar and at pH 7, through the peristaltic pump (2), with a water flow equal to 1 liter/day in order to have an empty bed contact time of 3.5 hours.

After 24 hours of elution, treated water samples were taken from the fraction collector (6) to analyse the remaining compounds therein: the results obtained are shown in Table 8.

TABLE 8

| Zeolite | SAR | TOC (mg/l) | Phenol-equivalent (ppm) |
|---|---|---|---|
| None (sample as such) | — | 4185 | 30.59 |
| Zeolite Y CBV 100[1] | 5 | 3083 | 9.50 |
| Zeolite Y CBV 720[1] | 30 | 2357 | 2.80 |
| Zeolite Y CBV 712[1] | 12 | 3776 | 26.00 |

TABLE 8-continued

| Zeolite | SAR | TOC (mg/l) | Phenol-equivalent (ppm) |
|---|---|---|---|
| ZSM-5[1] | 280 | 3542 | 18.20 |
| Mordenite[2] | 200 | 3500 | 15.60 |
| Zeolite FCC[3] | 10 | 3772 | 21.00 |

[1]zeolite by Zeolyst;
[2]zeolite by Tosoh;
[3]zeolite by Grace.

The above reported data show that the organic compounds are not totally removed: in fact, the values of the total organic carbon (TOC) contents show the presence of organic compounds mainly consisting of the organic compounds having 2 to 6 carbon atoms according to what shown in Table 7.

The removal of said organic compounds shown in Table 7 may be carried out, as shown by the examples below, sending said water to the nanofiltration unit.

Example 3

Salt Rejection: Comparison Between Two Hydrophilic Nanofiltration Membranes SelRO® MPS-44 and Desal®-5-DL Synthetic saline solutions in distilled water were used. Different single-component solutions were prepared with seven equimolar concentrations of each salt so as to compare the performance of the membranes on the different solutes, the concentration being equal: salts and concentrations are shown in Table 9.

TABLE 9

| | | Concentrations (moles/litre) | | | | | | |
|---|---|---|---|---|---|---|---|---|
| Salt | PM (Dalton) | 0.0007 | 0.0035 | 0.007 | 0.014 | 0.021 | 0.028 | 0.035 |
| | | Concentrations (ppm) | | | | | | |
| NaCl | 58.4 | 41 | 200 | 410 | 820 | 1200 | 1600 | 2000 |
| $MgCl_2 \cdot 6\ H_2O$ | 203.3 | 140 | 710 | 1400 | 2800 | 4300 | 5700 | 7100 |
| $Na_2SO_4$ | 142 | 99 | 500 | 990 | 2000 | 3000 | 4000 | 5000 |
| $MgSO_4 \cdot 7\ H_2O$ | 246.5 | 170 | 860 | 1700 | 3400 | 5200 | 6900 | 8600 |

Figure 4:
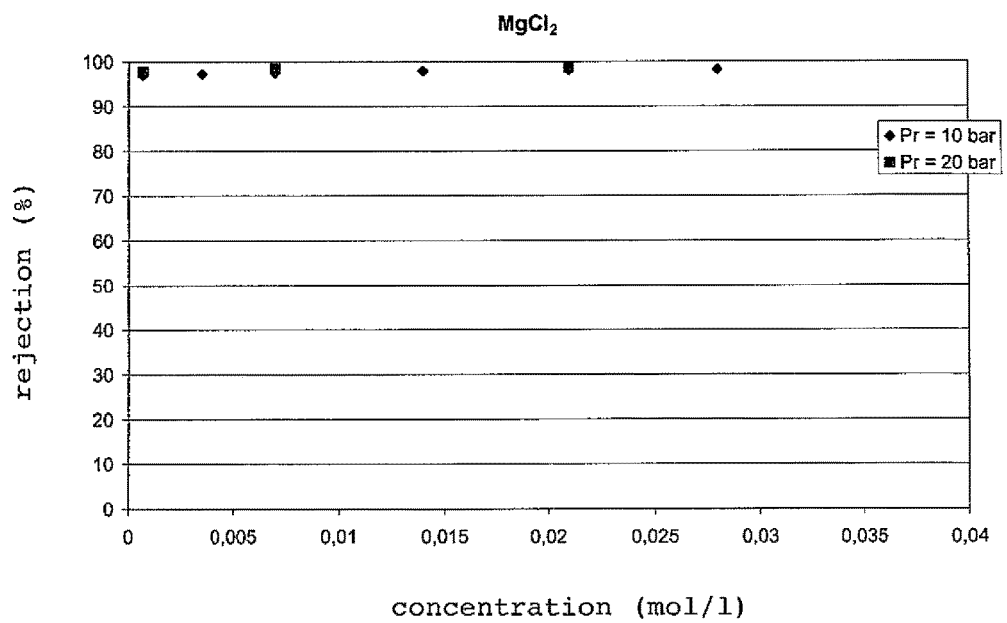
FIG. 4 shows the rejection percentage by membrane SelRO® MPS-44 towards $MgCl_2$ at different molar concentrations and at two different operating pressures.
Figure 5:
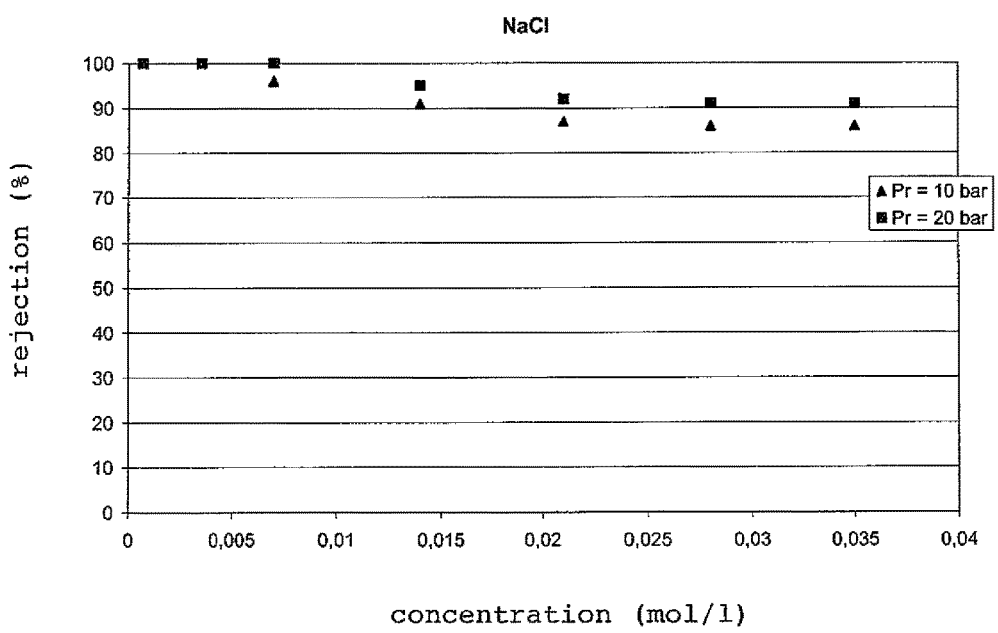
FIG. 5 shows the rejection percentage by membrane SelRO® MPS-44 towards NaCl at different molar concentrations and at two different operating pressures.

FIG. 4 and FIG. 5 show the results obtained in terms of rejection percentage by membrane SelRO® MPS-44 according to the present invention on magnesium and sodium chloride solutions at different molar concentrations and at two different operating pressures.

From the diagrams it is possible to see that the rejection of membrane SelRO® MPS-44 towards chlorides is very high. In the presence of diluted solutions, the rejection of sodium chloride is slightly higher than that of magnesium chloride. As the concentration increases, the rejection decreases up to reach an approximately constant value. For $MgCl_2$ the pattern is opposite, even though less evident: as the concentration increases, the rejection increases slightly up to exceed that of sodium chloride already at the concentration of 0.007 mol/l and reach constant values. The rejection of $Na_2SO_4$ and $MgSO_4$ by the SelRO® MPS-44 based on the concentration is constant and equal to 100% already at pressures of 10 bar.

Through the comparison with the membrane Desal®-5-DL (comparative), the performance achieved with the membrane according to the present invention (i.e. membrane SelRO® MPS-44) is even more evident.

Figure 6:
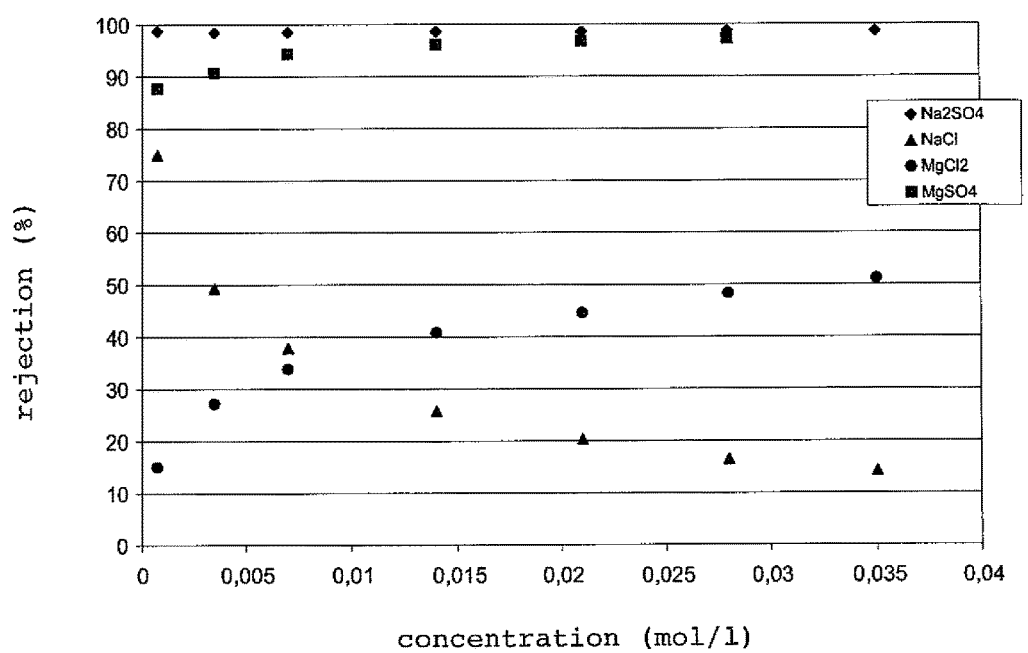
FIG. 6 shows the rejection percentage by membrane Desal®-5-DL on solutions of chloride and sulfate of sodium and of magnesium at different molar concentrations.

FIG. 6 shows the results obtained in terms of rejection percentage by membrane Desal®-5-DL on solutions of chloride and sulfate of sodium and of magnesium at different molar concentrations. The diagram shown in FIG. 6 shows, especially towards chlorides, a significant worsening of the rejection compared to the results obtained with membrane SelRO® MPS-44 according to the present invention.

Example 4

Rejection of Polar Organic Compounds not Removed by the Zeolites: Comparison Between Two Hydrophilic Nanofiltration Membranes SelRO® MPS-44 and Desal®-5-DL To this end, synthetic solutions were examined comprising polar organic compounds with a low and medium molecular weight, not removed by the zeolites as shown in Examples 1-2 above reported.

Solutions containing a single component at a time at the concentration equal to 1000 ppm, at an operating pressure equal to 10 bar, at a temperature equal to 20° C. and at pH 7, were examined using the pilot plant shown in FIG. 2. The specific flow (kg of permeate per square meter of surface of the hydrophilic nanofiltration membrane per hour) was equal to 1 $kg/(m^2 \times h)$.

Table 10 shows the chemical-physical properties of the polar organic compounds used and the rejections obtained using the hydrophilic nanofiltration membrane SelRO® MPS-44 according to the present invention.

TABLE 10

| Organic compound (1000 ppm) | Molecular weight (g/moles) | Equivalent molecular diameter (nm) | Rejection (%) |
|---|---|---|---|
| methanol | 32 | 0.504 | 15.5 |
| ethyleneglycol | 62.1 | 0.561 | 59.4 |
| tert-butanol | 74.1 | 0.669 | 97.6 |
| methyl-t-buthylether (MTBE) | 88.2 | 0.723 | 98.4 |
| diethyleneglycol | 106.1 | 0.670 | 91.6 |
| triethyleneglycol | 150.2 | 0.757 | 97.7 |

Table 11 shows the chemical-physical properties of the polar organic compounds used and the rejections obtained using the hydrophilic nanofiltration membrane Desal®-5-DL (comparative).

TABLE 11

| Organic compound (1000 ppm) | Molecular weight (g/moles) | Equivalent molecular diameter (nm) | Rejection (%) |
| --- | --- | --- | --- |
| methanol | 32 | 0.504 | 2 |
| ethyleneglycol | 62.1 | 0.561 | 4 |
| tert-butanol | 74.1 | 0.669 | 10 |
| methyl-t-buthyl ether (MTBE) | 88.2 | 0.723 | 15 |
| diethyleneglycol | 106.1 | 0.670 | 7 |
| triethyleneglycol | 150.2 | 0.757 | 14 |

The data reported in Table 11 show how the use of the hydrophilic nanofiltration membrane Desal®-5-DL (comparative) leads to a worsening of the rejection compared to the use of membrane SelRO® MPS-44 according to the present invention (see Table 10).

Example 5

Rejection of Organic Compounds not Removed by the Zeolites Through Nanofiltration Using the Hydrophilic Nanofiltration Membrane SelRO® MPS-44

To this end, synthetic solutions were examined comprising polar organic compounds with a low and medium molecular weight, not removed by the zeolites as shown in Examples 1-2 reported above.

Solutions containing a single component at a time at the concentration equal to 1000 ppm, at an operating pressure equal to 10 bar and to 20 bar, at a temperature equal to 20° C. and at pH 7, were examined using the pilot plant shown in FIG. 2. The specific flow (kg of permeate per square meter of surface of the hydrophilic nanofiltration membrane per hour) was equal to 1 kg/(m$^2$×h).

Table 12 shows the rejections obtained using the hydrophilic nanofiltration membrane SelRO® MPS-44 according to the present invention.

TABLE 12

| Organic compound (1000 ppm) | R (%) (10 bar) | R (%) (20 bar) | ΔR (%) |
| --- | --- | --- | --- |
| ethyleneglycol | 59.6 | 68.2 | 8.6 |
| acetone | 77.2 | 82.6 | 5.2 |
| 1-propanol | 86.5 | 88.8 | 2.3 |
| triethyleneglycol | 97.7 | 98.8 | 1.1 |

The above reported data show that the increase in rejection shifting from an operating pressure of 10 bar to one of 20 bar is higher when the molecule is smaller and therefore is less retained by the hydrophilic nanofiltration membrane. For larger molecules with high rejection values (87%-98%), a further increase in pressure does not lead to significant improvements in performance [ΔR (%) equal to about 1%-2%]; the smaller molecules, on the other hand, reach an increase of about 10% as pressure increases.

Example 6

Rejection of Organic Compounds not Removed by the Zeolites Through Nanofiltration Using the Hydrophilic Nanofiltration Membrane SelRO® MPS-44

To this end, synthetic solutions were examined comprising polar organic compounds with a low and medium molecular weight, not removed by the zeolites as shown in Examples 1-2 reported above.

Solutions containing one or two components at a time at the concentration equal to 1000 ppm, in the absence of metal salts, or in the presence of metal salts at concentrations equal to 3500 ppm and 7000 ppm, at an operating pressure equal to 10 bar, at a temperature equal to 20° C. and at pH 7, were examined using the pilot plant shown in FIG. 2. The specific flow (kg of permeate per square meter of surface of the hydrophilic nanofiltration membrane per hour) was equal to 1 kg/(m$^2$×h).

Table 13 shows the concentrations of metal salts present and the rejections obtained using the hydrophilic nanofiltration membrane SelRO® MPS-44 according to the present invention.

TABLE 13

| Organic compound (1 g/l) | R (%) (no salt) | R (%) (presence of salt) | Salt |
| --- | --- | --- | --- |
| ethyleneglycol | 59.6 | 55.1 | NaCl (3500 ppm) |
| acetone | 77.2 | 76.2 | NaCl (3500 ppm) |
| iso-propanol | 90.0 | 88.5 | NaCl (3500 ppm) MgCl$_2$ (3500 ppm) |
| triethyleneglycol | 97.7 | 96.1 | NaCl (3500 ppm) |
| methanol + ethanol | 39.2 | 36.7 | NaCl (3500 ppm) |
| methanol + ethanol | 39.2 | 35.2 | NaCl (3500 ppm) |

The above reported data show that the high salinity does not essentially change the performance of the hydrophilic nanofiltration membrane SelRO® MPS-44: in fact, the addition of salts only causes a limited reduction of the rejection.

Example 7

Rejection of Heavy Metal Salts not Removed by the Zeolites Through Nanofiltration Using the Hydrophilic Nanofiltration Membrane SelRO® MPS-44

Synthetic solutions of chlorides of copper, of zinc, of cadmium, of lead and of manganese, not removed by the zeolites, at a concentration equal to 1 ppm, at operating pressure of 10 bar, at temperature of 20° C. and at a pH 7, were examined using the pilot plant shown in FIG. 2. The specific flow (kg of permeate per square meter of surface of the hydrophilic nanofiltration membrane per hour) was equal to 1 kg/(m$^2$×h).

The rejections by the hydrophilic nanofiltration membrane SelRO® MPS-44 towards the metals present in said solutions were found to be ranging from 98.5% to 99.8%.

The invention claimed is:

1. A process for treatment of contaminated water comprising: sending said contaminated water to a system comprising:
   at least one adsorption unit including at least one microporous or mesoporous alumino-silicate; and
   at least one nanofiltration unit including at least one hydrophilic nanofiltration membrane;
   wherein said at least one hydrophilic nanofiltration membrane comprises a base layer, a porous support layer, and a layer having an active material comprising polyalkylsiloxanes and has a contact angle with water lower than or equal to 45°;
   wherein said contaminated water is water contaminated by oil dispersed or in emulsion, and optionally contaminated by polar and/or apolar organic compounds and/or by heavy metal salts and wherein the contaminated water is treated by the at least one adsorption unit and the at least one nanofiltration unit, the at least one adsorption unit removes polar organic compounds having a number of carbon atoms higher than 8, said apolar organic compounds, and said oil dispersed or in emulsion present in said contaminated water and the at least one nanofiltration unit removes polar organic compounds having a carbon number lower than or equal to 8 and said heavy metal salts present in water directly sent from the at least one adsorption unit to the at least one nanofiltration unit.

2. The process for the treatment of said contaminated water according to claim 1, wherein said contact angle ranges from 25° to 40°.

3. The process for the treatment of said contaminated water according to claim 1, wherein said contaminated water is selected from: production water deriving from oil or gas wells; injection water deriving from water pumped into a well and returning to the well surface together with hydrocarbons; refinery water; water deriving from petrochemical industries; or groundwater from refining and/or from petrochemical industries.

4. The process for the treatment of said contaminated water according to claim 1, wherein said polar organic compounds are present in said contaminated water in an amount ranging from 1 ppm to 30000 ppm.

5. The process for the treatment of said contaminated water according to claim 1, wherein said apolar organic compounds are present in said contaminated water in an amount ranging from 1 ppm to 30000 ppm.

6. The process for the treatment of said contaminated water according to claim 1, wherein said heavy metal salts are present in said contaminated water in an amount ranging from 0.1 ppm to 40000 ppm.

7. The process for the treatment of said contaminated water according to claim 1, wherein said contaminated water comprises salts of alkaline or alkaline-earth metals.

8. The process for the treatment of said contaminated water according to claim 7, wherein said salts of alkaline or alkaline-earth metals are present in said contaminated water in an amount ranging from 0.1 ppm to 40000 ppm.

9. The process for the treatment of said contaminated water according to claim 1, wherein said oil, dispersed or in emulsion, is present in said contaminated water in an amount ranging from 50 ppm to 500 ppm.

10. The process for the treatment of said contaminated water according to claim 1, wherein said at least one microporous or mesoporous alumino-silicate is selected from zeolites having an average pore diameter ranging from 3.5 Å to 7.5 Å.

11. The process for the treatment of said contaminated water according to claim 1, wherein said at least one microporous or mesoporous alumino-silicate has a silica/alumina molar ratio (SAR) ranging from 2 to 500.

12. The process for the treatment of said contaminated water according to claim 10, wherein said zeolites are selected from silicalite, zeolite ZSM-5, zeolite Y, mordenite, beta zeolite, ferrierite, or mixtures thereof.

13. The process for the treatment of said contaminated water according to claim 1, wherein said at least one microporous or mesoporous alumino-silicate has an average pore diameter ranging from 25 Å to 500 Å.

14. The process for the treatment of said contaminated water according to claim 1, wherein said at least one microporous or mesoporous alumino-silicate has a silica/alumina molar ratio (SAR) ranging from 30 to infinite.

15. The process for the treatment of said contaminated water according to claim 1, wherein said at least one microporous or mesoporous alumino-silicate has a pore volume ranging from 0.3 ml/g to 1.3 ml/g.

16. The process for the treatment of said contaminated water according to claim 1, wherein said at least one microporous or mesoporous alumino-silicate has a specific surface area ($S_{BET}$) higher than or equal to 500 m$^2$/g.

17. The process for the treatment of said contaminated water according to claim 1, wherein said at least one microporous or mesoporous alumino-silicate has a completely amorphous structure.

18. The process for the treatment of said contaminated water according to claim 1, wherein said at least one microporous or mesoporous alumino-silicate material has a substantially amorphous structure.

19. The process for the treatment of said contaminated water according to claim 1, wherein said contaminated water is kept in contact with said at least one microporous or mesoporous alumino-silicate for a time ranging from 1 minute to 5 hours.

20. The process for the treatment of said contaminated water according to claim 1, wherein said at least one hydrophilic nanofiltration membrane has a permeability to water, measured at 22° C., ranging from 0.5 l/(m$^2$×h×bar) to 5 l/(m$^2$×h×bar).

21. The process for the treatment of said contaminated water according to claim 1, wherein said at least one hydrophilic nanofiltration membrane has a surface energy ranging from 40 mN/m to 80 mN/m.

22. The process for the treatment of said contaminated water according to claim 1, wherein said at least one hydrophilic nanofiltration membrane has a maximum operating temperature ranging from 15° C. to 50° C.

23. The process for the treatment of said contaminated water according to claim 1, wherein said at least one hydrophilic nanofiltration membrane has a maximum operating pressure ranging from 5 bar to 45 bar.

24. The process for the treatment of said contaminated water according to claim 1, wherein said at least one hydrophilic nanofiltration membrane has a molecular weight cut-off (MWCO) ranging from 150 dalton to 300 dalton.

25. The process for the treatment of said contaminated water according to claim 1, wherein said at least one hydrophilic nanofiltration membrane has a maximum operating pH ranging from 1 to 12.

26. The process for the treatment of said contaminated water according to claim 1, wherein the active material of said at least one hydrophilic nanofiltration membrane comprises polydimethylsiloxanes.

27. The process for the treatment of said contaminated water according to claim 1, wherein a specific flow (kg of permeate per square meter of surface of the at least one hydrophilic nanofiltration membrane per hour) ranges from 0.5 kg/(m$^2$×h) to 50 kg/(m$^2$×h).

28. The process for the treatment of said contaminated water according to claim 1, wherein said contaminated water is sent to said system at a temperature ranging from 10° C. to 40° C.

29. The process for the treatment of said contaminated water according claim 1, wherein said contaminated water is sent to said system at a pH ranging from 1 to 12.

30. The process for the treatment of said contaminated water according to claim 1, wherein said contaminated water is sent to said system at a pressure ranging from 0.5 bar to 35 bar.

* * * * *